(12) United States Patent
Wilson et al.

(10) Patent No.: US 6,857,261 B2
(45) Date of Patent: Feb. 22, 2005

(54) MULTI-MODE PULSED DETONATION PROPULSION SYSTEM

(75) Inventors: Donald R. Wilson, Arlington, TX (US); Frank K. Lu, Arlington, TX (US)

(73) Assignee: Board of Regents, The University of Texas System, Austin, TX (US)

( * ) Notice: Subject to any disclaimer, the term of this patent is extended or adjusted under 35 U.S.C. 154(b) by 0 days.

(21) Appl. No.: 10/337,920

(22) Filed: Jan. 7, 2003

(65) Prior Publication Data
US 2004/0128977 A1 Jul. 8, 2004

(51) Int. Cl.⁷ .................................................. F02K 7/02
(52) U.S. Cl. ........................... 60/204; 60/225; 60/248; 60/768
(58) Field of Search ........................ 60/204, 225, 247, 60/248, 249, 768; 180/65.2

(56) References Cited

U.S. PATENT DOCUMENTS

| | | | |
|---|---|---|---|
| 2,740,254 A | * | 4/1956 | Ballauer et al. ............. 60/248 |
| 2,834,181 A | * | 5/1958 | Paris ........................... 60/225 |
| 4,042,056 A | * | 8/1977 | Horwinski ................. 180/65.2 |
| 4,592,202 A | | 6/1986 | Stewart et al. |
| 5,052,176 A | * | 10/1991 | Labatut et al. ............. 60/225 |
| 5,129,227 A | | 7/1992 | Klees et al. |
| 5,205,119 A | | 4/1993 | Bulman |
| 5,216,878 A | | 6/1993 | Klees |
| 5,327,721 A | | 7/1994 | Bulman |
| 5,341,640 A | | 8/1994 | Faulkner |
| 5,694,768 A | * | 12/1997 | Johnson et al. ............. 60/768 |
| 5,873,240 A | | 2/1999 | Bussing et al. |
| 5,946,904 A | | 9/1999 | Boehnlein et al. |
| 6,293,091 B1 | * | 9/2001 | Seymour et al. ............. 60/225 |
| 6,550,235 B2 | * | 4/2003 | Johnson et al. ............. 60/204 |

FOREIGN PATENT DOCUMENTS

GB 2090916 * 7/1982

* cited by examiner

*Primary Examiner*—Michael Koczo
(74) *Attorney, Agent, or Firm*—Gardere Wynne Sewell LLP

(57) ABSTRACT

A multi-mode propulsion system for potential application to hypersonic and aerospace planes. The system can employ various propulsion modes at various points in time, with the propulsion system employed at a given point in time being selected according to the velocity of the inlet airflow. In one embodiment, the propulsion system of the present invention has an ejector-augmented pulsed detonation rocket propulsion mode, a pulsed normal detonation wave engine mode, a steady oblique detonation wave engine mode, and a pure pulsed detonation rocket mode.

35 Claims, 17 Drawing Sheets

MULTI-MODE PULSED DETONATION PROPULSION SYSTEM

BACKGROUND

A number of propulsion systems have been studied for use in hypersonic cruise and transatmospheric vehicles. These include, for example, the dual mode ramjet/scramjet engine and the rocket-based combined cycle (RBCC) engine. Unfortunately, each conventional propulsion system incorporates limitations that preclude the adoption of any single propulsion system suitable for all applications.

A dual mode ramjet-scramjet engine, for example, has good specific impulse over a Mach number range from about 3 to 10, but does not operate efficiently at either lower or higher Mach numbers, and has no static thrust capability.

The use of Rocket Based Combined Cycle (RBCC) propulsion systems could potentially offer improved performance over that of conventional cycles involving purely rocket or purely air-breathing concepts. Daines and Segal provide a broad summary of recent research in this area, with emphasis on weight savings, flight path planning and cycle efficiencies. The individual rocket and air-breathing cycles have inherent limitations. Although capable of operating over a very wide range of altitudes and Mach numbers, the pure rocket mode is hampered by very low specific impulse compared to air-breathing engine concepts. Air-breathing engines yield substantially higher values of specific impulse but conventional engine concepts are only capable of efficient operation over a narrow Mach number and altitude range. By combining the attributes of both rocket and air-breathing engine concepts, the RBCC offers improvements in performance.

Unfortunately, operation of RBCC engine concepts are inherently limited by the energy release rates of the deflagrative combustion processes employed in their combustion chambers. Deflagration combustion is a type of burning in which the flame front propagates into the fuel-oxidizer mixture at low subsonic speeds. This imposes limitations on energy release rate, and is accompanied by losses in total pressure.

More recently, pulse detonation engines (PDEs), operating in either an air-breathing or rocket mode, have been proposed as an alternative to conventional propulsion systems. The pulse detonation engine is an intermittent, constant-volume combustion engine concept. Air breathing engines based on the PDE cycle offer the promise of improved cycle efficiency and specific thrust, reduced specific fuel consumption and a wide operational range, while improved specific impulse has been demonstrated for certain rocket engine applications. Both propulsion systems may benefit from significant weight and cost reductions due to reduction or elimination of turbomachinery components.

A pulsed detonation engine consists of a chamber in which fuel and oxidizer are mixed and filled followed by a spark ignition. This initiates a detonation wave, which is a complex wave system generally characterized by a sharp pressure rise (up to 30 times or more), and a region of chemical reaction leading an expansion wave. This wave system traverses the detonation tube and is finally allowed to expand into a nozzle system. The high-speed combustion approximates a constant volume process and results in greater cycle efficiency. The detonation tube thus accommodates compression, combustion and expansion in one simple flow path.

Unfortunately, the current concepts being advocated for pulse detonation engines have performance limitations when required to operate over a wide Mach number range. The need to reduce the Mach number from its free stream value to a very low value prior to entering the detonation chamber through the intermittent air valve generally prevents the operation of air-breathing PDE's above flight Mach numbers of about 4. Above Mach 4, the temperature rise associated with the gas dynamic compression process in the inlet causes the air temperature to exceed the autoignition temperature of the fuel, which prevents detonation from occurring. Pulse Detonation Rockets (PDR) avoid this problem, but their specific impulse capability at low Mach numbers is much lower than air-breathing PDE's.

SUMMARY OF THE INVENTION

Development of improved propulsion systems for hypersonic cruise or transatmospheric vehicles requires improvement in the specific thrust and specific impulse over conventional air-breathing or rocket-based systems across a relatively wide range of Mach numbers. In order to overcome limitations inherent in conventional designs, the inventors have integrated various engine cycles suitable for efficient operation over a broad range of Mach numbers and altitudes into a single flow path.

The multi-mode pulsed detonation propulsion system of the present invention combines the best features of various engine concepts in a manner that circumvents many of the performance limitations of the individual propulsion systems. Moreover, the present invention provides the potential for operation over a relatively wide range of Mach numbers and altitudes with a single flow path propulsion system. Such a system may have significantly lower weight and volume penalties than those of comparable propulsion systems requiring two or more separate flow paths. The teachings of the present invention do not depend critically upon the exact configuration used.

As noted, the proposed multi-mode pulsed detonation engine has application to at least two important flight vehicle concepts: a transatmospheric vehicle for access to space and an atmospheric cruise vehicle. In one embodiment, the invention employs four modes of operation, all integrated into a single flow path.

For low-speed operation, from take-off to Mach numbers on the order of 3 to 4, an ejector-augmented pulse detonation rocket engine concept is employed in certain embodiments. This concept may be similar to the conventional air-augmented ejector rocket, except that the operation would be in the pulsed mode. Experimental measurements have indicated that ejector mixing is enhanced with a pulsating core flow.

In a second mode, the engine functions as a detonation wave scramjet engine in certain embodiments. This system may operate at flight Mach numbers from approximately 3 to 8. This system is somewhat similar to the conventional scramjet propulsion system, but uses unsteady detonation waves to increase pressure levels beyond that attainable in scramjet engines that employ deflagration burning. Fuel may be injected into the supersonic flow through the engine at a location upstream of the detonation chamber.

In certain embodiments, the engine functions in a third mode as a steady oblique detonation wave engine. In this mode, the system may operate at flight mach numbers from approximately 8 to 12. Once the detonation chamber Mach number exceeds the Chapman-Jouguet Mach Number, the detonation waves produced in the second mode are convected downstream. Insertion of oblique wedges downstream of the Mode 2 detonation chamber will tend to stabilize the detonation wave as a steady oblique detonation wave.

At Mach numbers above approximately 12, the engine operation may convert, in certain embodiments, to a pure pulse detonation rocket. This would require closing of the inlet flow path.

BRIEF DESCRIPTION OF THE DRAWINGS

For a more complete understanding of the features and advantages of the present invention, reference is now made to the detailed description of the invention along with the accompanying figures in which corresponding numerals in the different figures refer to corresponding parts and in which.

DETAILED DESCRIPTION OF THE INVENTION

While the making and using of various embodiments of the present invention are discussed in detail below with reference to certain contexts, it should be appreciated that the present invention provides many applicable inventive concepts that can be embodied in a wide variety of specific contexts. The specific embodiments discussed herein are merely illustrative of specific ways to make and use the invention and do not delimit the scope of the invention.

The present invention disclosed herein comprises improved thrust generation devices and systems designed to overcome many of the shortcomings inherent in prior devices and systems. In many embodiments, the multi-mode ejector augmented pulsed detonation rocket and pulsed normal detonation wave engine concept of the present invention provides enhanced performance as compared to prior designs, and may facilitate more versatility with respect to design options.

Figure 1A:
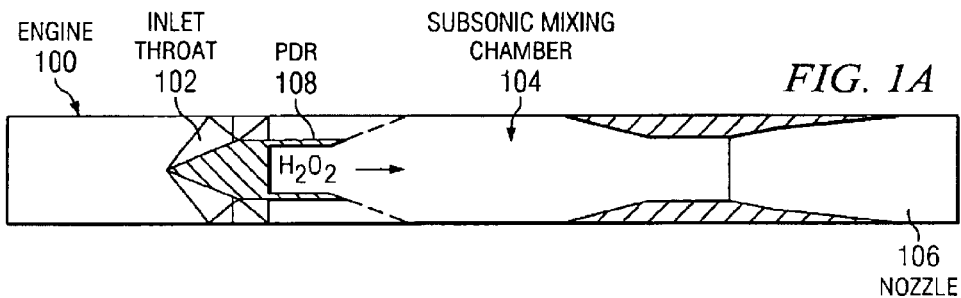
FIGS. 1A–1C are schematic diagrams depicting the operation of a multi-mode pulsed detonation engine according to one embodiment of the present invention.
Figure 1B:
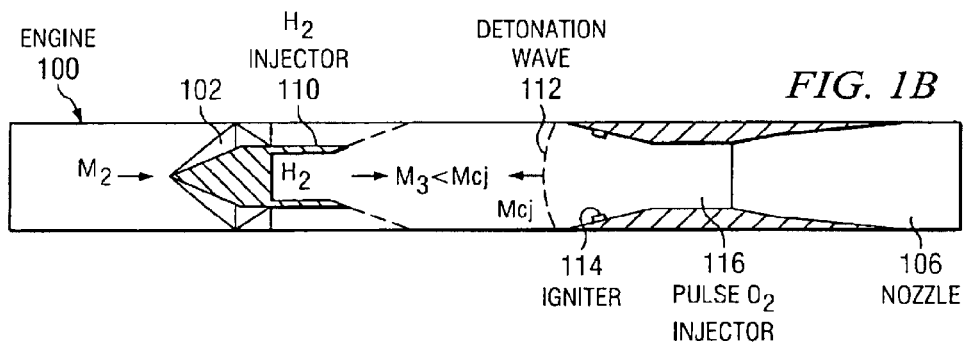
Figure 1C:
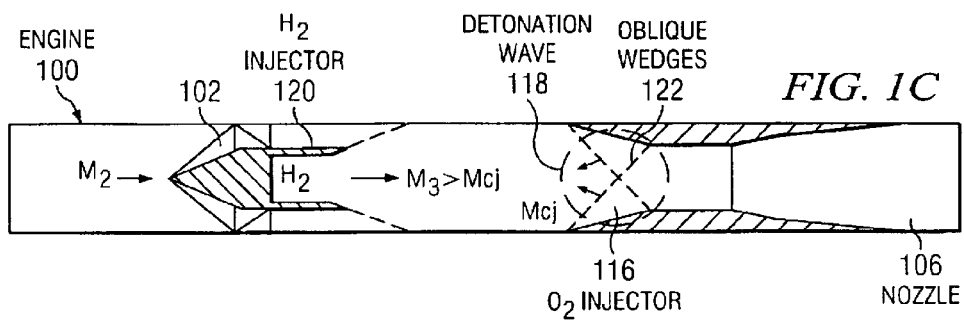

FIGS. 1A–1C are schematic diagrams of one embodiment of a multimode propulsion system according to certain embodiments of the present invention. The novel multi-mode propulsion system of FIGS. 1A–1C may be employed for potential application to hypersonic and aerospace planes, as examples. The basic concept illustrated in FIGS. 1A–1C includes the following modes of operation:

1. An ejector-augmented pulse detonation rocket (PDR) mode for take-off to moderate supersonic Mach numbers (FIG. 1A),
2. A pulsed normal detonation wave engine (NDWE) mode for operation at flight Mach numbers from approximately 3 to 7, which correspond to combustion chamber Mach numbers less than the Chapman-Jouguet Mach number (FIG. 1B), and
3. An oblique detonation wave engine (ODWE) mode of operation for flight Mach numbers that result in detonation chamber Mach numbers greater than the Chapman-Jouguet Mach number (FIG. 1C).

For low-speed operation, from take-off to Mach numbers on the order of 3 to 4, an ejector-augmented pulse detonation rocket mode may be employed, as shown in FIG. 1A. Engine 100 includes an inlet 102, a mixing chamber 104, and a downstream nozzle 106. Upstream of the mixing chamber 104 is a PDR 108. In this mode, the mixing chamber 104 is subsonic. This concept would be similar to the conventional air-augmented ejector rocket except that the operation would be in the pulsed mode. Research has indicated that ejector mixing can be enhanced through the use of a pulsating core flow. This research found that maximum thrust augmentation ratios of 1.9 were obtained with a pulsating core flow, compared to a ratio of 1.35 for steady core flows in the same ejector configuration. Computational flow dynamics simulations demonstrate that using hot pulsating flow from the primary nozzle may further improve performance by enhancing mixing and combustion rates. The interaction between the strong pressure waves and the mixing layer may tend to stimulate the formation of mixing vortices, while shock-heating of the mixture may allow for more rapid combustion. Finally, the oscillating shear layer between the pulsating core flow and the ejector flow may tend to increase the entrainment rate of the secondary flow.

In a second mode, the engine may function as a detonation wave scramjet engine, as shown in FIG. 1B. The mode shown in FIG. 1B may operate at flight Mach numbers from approximately 3 to 8. The propulsion system is somewhat similar to the conventional scramjet propulsion system, but uses unsteady detonation waves to increase pressure levels beyond that attainable in scramjet engines that employ deflagration burning. Fuel may be injected into the supersonic flow through the engine at a location upstream of the detonation chamber.

In this mode, engine 100 employs the same inlet 102 and downstream nozzle 106 as in the first mode. This second mode employs one or more H2 injectors 110 downstream of inlet 102 and upstream of mixing chamber 104. An igniter 114 is disposed downstream of the mixing chamber 104. A pulsed O2 injector 116 is disposed downstream of the igniter 114.

For duct Mach numbers lower than the CJ Mach number, ignition of the near stoichiometric fuel-air mixture at a downstream location will cause a detonation wave 112 to be formed, as illustrated in FIG. 1B, that will move upstream at a velocity of $V_3-V_{CJ}$. This wave will propagate upstream until it is extinguished due to lack of sufficient fuel to sustain combustion. The flow entering the chamber 104 will then purge residual combustion products, allowing the cycle to be repeated. The pressure increase produced by the upstream propagating detonation wave 112 will be converted to useful thrust in downstream expansion in the nozzle 106. This approach will greatly extend the operating Mach number range of conventional air-breathing PDEs, which are generally limited to Mach numbers on the order of 4 due to heating of the airflow, during the inlet compression, to temperatures in excess of the autoignition temperature of the fuel. By allowing the detonation wave 112 to propagate upstream through a lower temperature supersonic flow, the autoignition problem is alleviated.

In a third mode, the engine may function as a steady oblique detonation wave engine, as illustrated in FIG. 1C. In this mode, the system may operate at flight mach numbers from approximately 8 to 12. Once the detonation chamber Mach number exceeds the Chapman-Jouguet Mach Number, the detonation waves 112 produced in Mode 2 are convected downstream. Insertion of oblique wedges 122 downstream of the Mode 2 detonation chamber will tend to stabilize the detonation wave 112 as a steady oblique detonation wave.

The chambers 120 located in vertical struts mounted in the inlet throat section 102 may be used to inject hydrogen fuel into the airstream in a pulsating mode to enhance mixing. The downstream wedges 122 generate oblique stock waves 118. Secondary oxygen injection through injectors 116 located in the surface of the wedges 122 will promote transition to oblique detonation waves 118. A high frequency ignition source can be used to initiate the detonation process through the ignitors 114. In certain embodiments, an ignition source capable of delivering discharges with peak power levels on the order of 2 MW may be employed. The large pressure increase through the detonation waves 118 will be recovered as thrust by expanding the flow through the nozzle 106 located downstream of the combustion zone.

In addition to the above, a fourth mode of operation, for example a pure PDR mode of operation, may be employed at very high Mach numbers and altitudes.

It can be seen that the various detonation-based combustion modes of the present invention may be readily integrated into a single flow path, which will tend to reduce propulsion system volume and mass requirements. Furthermore, as described above, thrust may be generated in critical parts of the trajectory by using upstream traveling normal detonation waves in an internal supersonic flow field. This provides the possibility of extending the operational range of pulsed detonation wave engines to much higher flight speeds than can be achieved with conventional PDE concepts.

Figure 2:
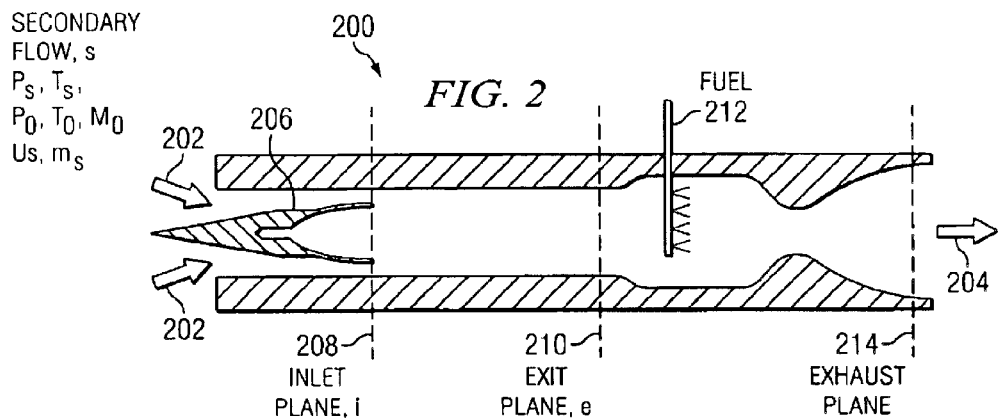
FIG. 2 is a schematic diagram depicting the operation of an ejector-augmented rocket.

The operation of an ejector-augmented rocket 200 is shown schematically in FIG. 2. Rocket engine 200 is embedded in an incoming airstream 202. In the art of rocket design, rocket exhaust 204 is referred to as the primary flow, while the air inflow 202 is the secondary flow. It can be seen in FIG. 2 that the secondary flow 202 passes into the inlet 206 past the inlet plane 208, and the exit plane 210, after which point it passes the fuel injectors 212. After combustion, the airflow, in the form of rocket exhaust 204, passes the exhaust plane 214 and exits the rocket engine 200. By entraining secondary flow 202 and adding momentum to it at appropriate conditions of mass flow rate, temperature and pressure, it is possible to enhance the performance of the pure rocket system significantly. Further, in a device such as a scramjet, the ejector offers a viable alternative for improving performance at low speeds.

A pulsating primary flow 204, such as that found in a pulsejet engine, enhances mixing with the secondary flow 202. This is the result of unsteady vortical features, particularly at high peak pressures, which excite modes of flow interaction that are not available in a steady state ejector-mixing duct.

Figure 3A:
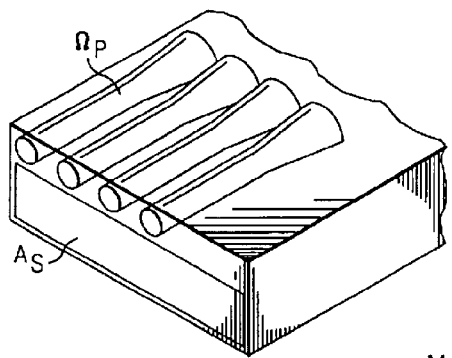
FIGS. 3A and 3B are schematic diagrams of a top-wall mounted pulsed detonation rocket according to certain teachings of the present invention.
Figure 4A:
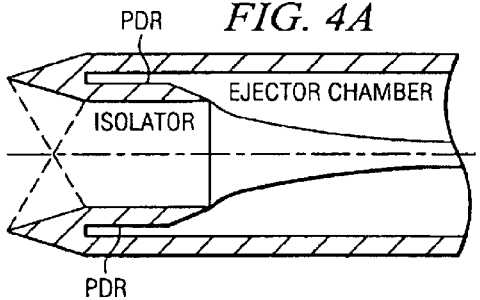
FIGS. 4A and 4B are schematic diagrams of a strut-mounted pulsed detonation rocket according to certain teachings of the present invention.
Figure 3B:
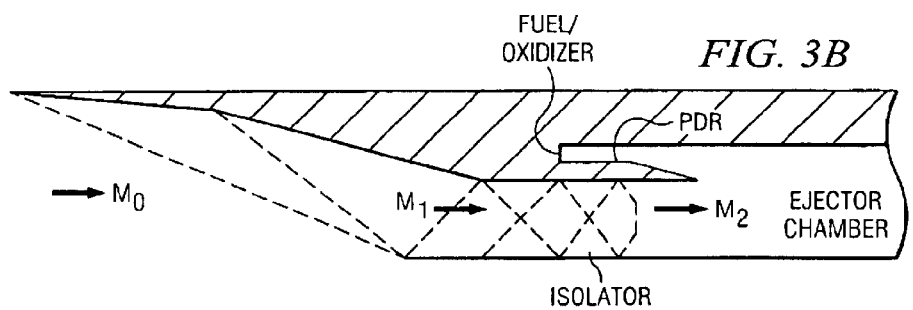
Figure 4B:
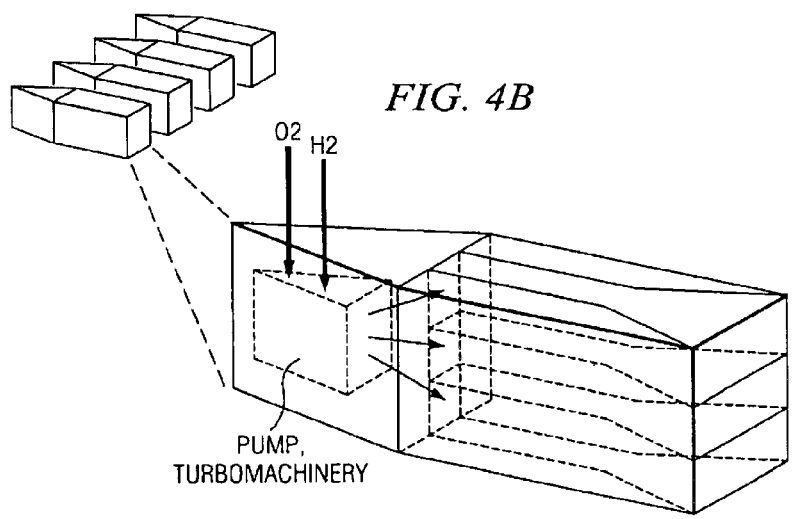

A number of embodiments of practical implementation of the ejector-PDR are sketched in FIGS. 3A, 3B, 4A and 4B. FIGS. 3A and 3B relate to a top-wall mounted PDR, with minimal interference with the inflow. This is particularly beneficial at supersonic secondary flow speeds, when strong internal shocks may be avoided. FIGS. 4A and 4B relate to a strut mounted PDR configuration, in which struts are placed inside and across a scramjet air intake consisting of rocket engines. This allows for better mixing between primary and secondary flow stream due to the vorticity and pressure gradients caused by the internal shock system.

It is required to specify the volume of individual PDR tubes that provide a required level of thrust at a given operating frequency. When some preliminary estimate for the thrust required and the specific impulse expected are available, the fuel mass flow rate $m_f$ can be deduced. With this number and the cycle time of the PDRs (N in number) and the density of the propulsive mixture, the volume of each PDR can be sized according to:

$$\Omega_p = \frac{m_f \Delta t}{N \rho_p}$$

The primary PDR nozzle exhaust area $A_p$ may be determined from mean mass flow rate considerations (primary mass flow rate, or fuel mass flow rate), using an exponential model for density and velocity variations in a detonation wave profile. With due manipulation, the mean mass flow rate leaving a set of PDRs may be evaluated to be:

$$\bar{m}_p = \frac{N A_p U_{max}}{\Delta t}\left[\frac{\rho_{min} + \rho_{max}}{2\lambda}\right] \text{ where}$$

$$u(t) = U_{max} e^{-\lambda t}, \rho(t) = \rho_{min} + (\rho_{max} - \rho_{min})e^{-\lambda t}$$

In the above, $\lambda$ is the time constant for the exponential variations of velocity and density behind a detonation wave. Typically the value of $\lambda$ is different for different flow variables. However, as a simplistic first-cut approximation, it has been assumed to be identical, it is also assumed in this analysis that $\lambda \Delta t \gg 1$, (where $\Delta t$ is the time period of each PDR cycle). Typical values of $\lambda \Delta t \approx 10$ are well within the scope of the present analysis. For a cycle frequency of 200 Hz, this yields a value of $\lambda=2000$.

The ratio of the primary to secondary mass flow rate is determined in the quasi-one-dimensional cycle averaged ejector mode analysis. This number should be in accordance with the estimate for "proper" afterburning of incoming air such that the net increase in specific energy due to afterburning is maximized. An alternate method of taking this into consideration is to include it as a loss mechanism and assume that the total temperature of the mixed primary and secondary flows reaches a smaller fraction of the initial total temperature of the primary flow. The cross sectional area of the secondary flow in order for stoichiometric afterburning to be achieved, is:

$$A_s = \frac{8 N \Omega_p \rho_p}{\eta_{ab} u_s \rho_s \Delta t}$$

Total pressure in the detonation chamber exhaust can be computed using data from the NASA-CEA code. This number is employed in the ideal cycle analysis. First, the total temperature is obtained using the energy equation:

$$T_t = \frac{C_p T + \frac{u^2}{2}}{C_p}$$

in which the specific heat of the detonation products for a H2/O2 PDR is 16.279 kJ/kgK, and a post-detonation temperature of 3682 K with velocity of 1543 m/s are used. A total temperature of 3755 K from these relations can then be used to compute the stagnation pressure from the relation:

$$\frac{p_t}{p} = \left(\frac{T_t}{T}\right)^{\gamma/(\gamma-1)}$$

where the value of $\gamma$ is taken to be 1.1287 from the CEA analysis. Using a post-detonation static pressure of 19.045 bar, this results in a stagnation pressure of 20.378 bar.

The equation set presented in the prior art is used with cycle-averaged quantities to determine the performance of PDR ejectors. The following properties are used in the present invention:

$$\frac{P_p}{P_o} = 20, \frac{T_p}{T_o} = 12.5 \text{ at takeoff}$$

$$\frac{A}{A_p} = 7.7, \gamma = 1.4 \quad \frac{A_{10}}{A_o} = 0.8 \quad \frac{P_{10}}{P_o} = 1$$

Net thrust is augmented by a factor of 1.7 times when the secondary flow Mach number is zero, and gradually loses its effect as the Mach number increases beyond 1.5. As a simple model, a linear variation of threat augmentation from 1.7 to 1 between secondary Mach numbers of 0 and 2 can be used to correct for the unsteadiness. Further, PDR specific impulse is augmented by partial filling of the detonation chambers. Fill fractions going from 33% to 100% during the range of operation of the ejector are used to match the take-off specific impulse from SSTO missions of interest.

The incompressible flow estimate represents at low speeds the maximum attainable thrust augmentation. At supersonic speeds, the possibility of afterburning increases the potential thrust that may be generated.

Figure 5:
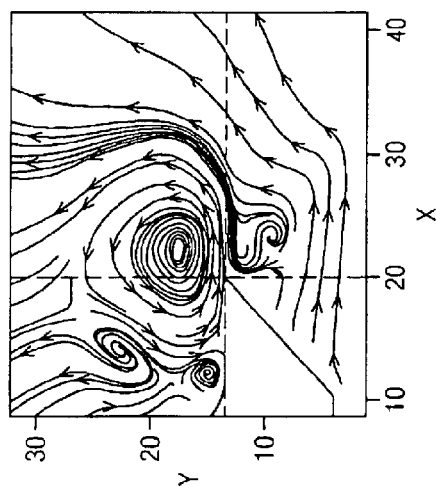
FIG. 5 is a sample plot of thrust and specific impulse from a multi-cycle airbreathing pulsed detonation engine.
Figure 6:
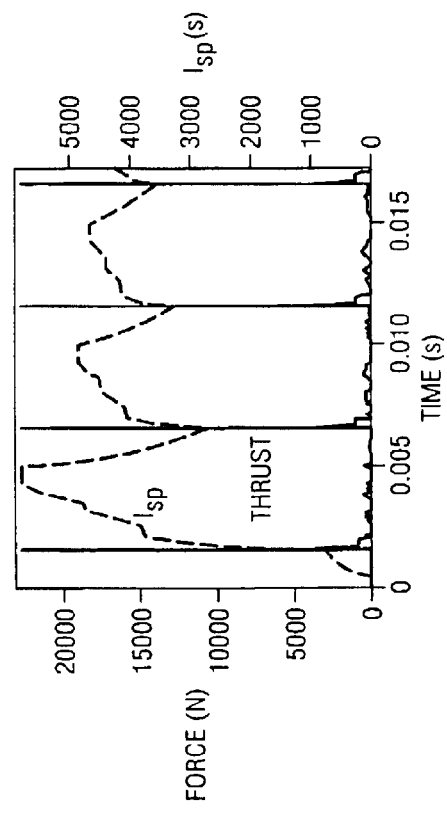
FIG. 6 is a sample mixing region at the exhaust of a pulsed detonation rocket, of a flow that is mixing and burning.
Figure 8:
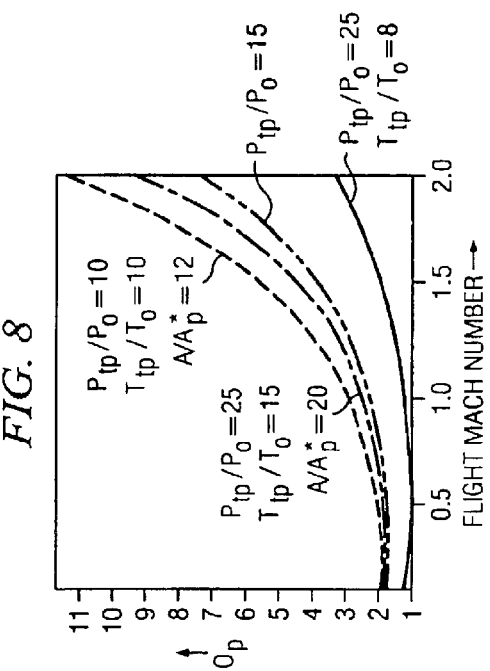
FIG. 8 shows a graph showing an ideal cycle compressible flow estimate of ejector system thrust augmentation.
Figure 7:
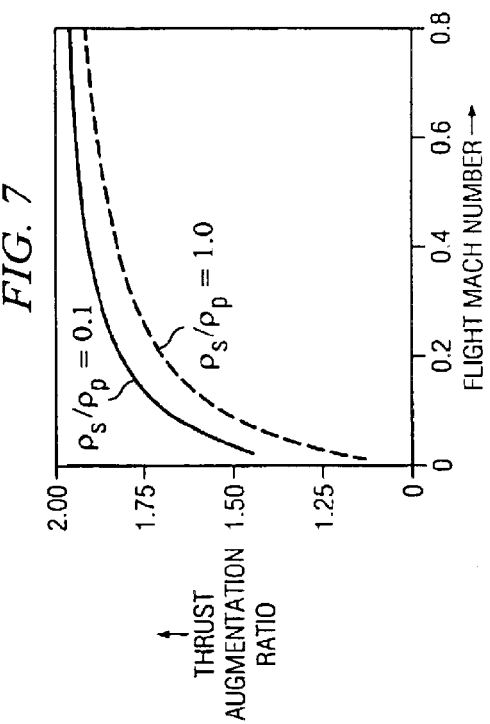
FIG. 7 shows a graph showing an ideal cycle averaged incompressible flow estimate of ejector thrust augmentation.
Figure 9:
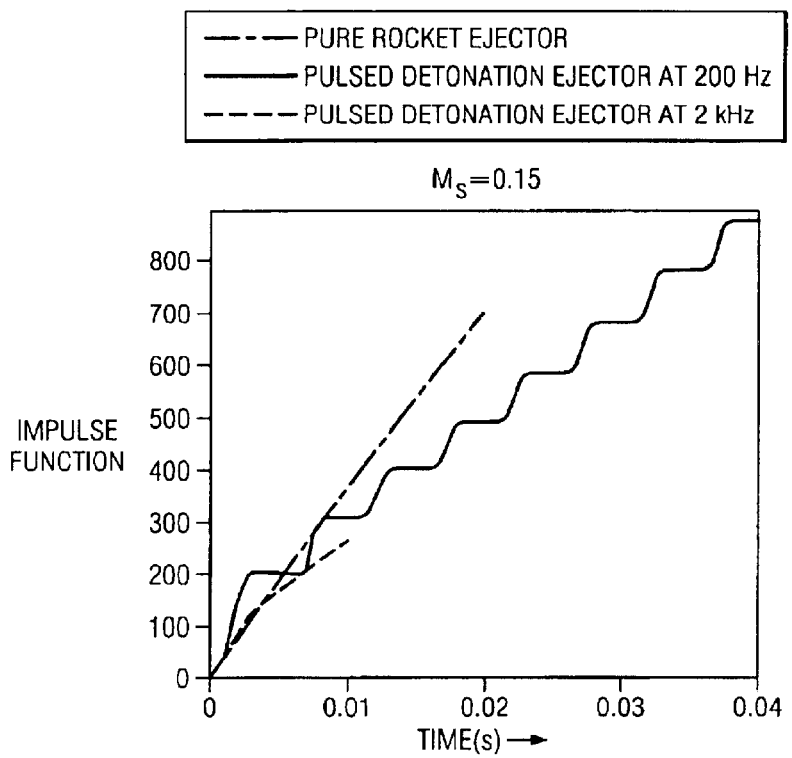
FIG. 9 is a graph showing impulse variation as function of time for certain embodiments of the present invention.
Figure 10:
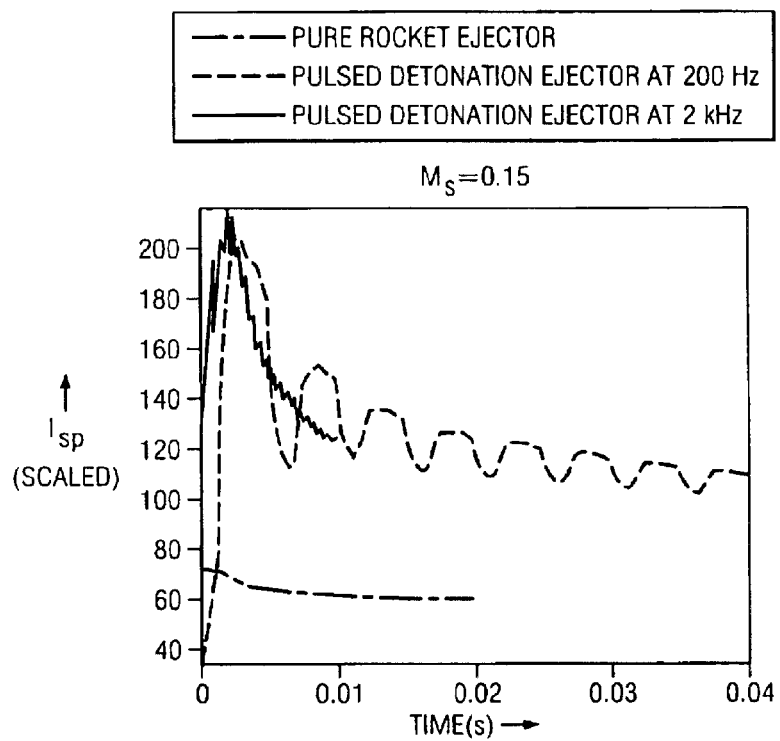
FIG. 10 is a graph showing Isp variation as a function of time for certain embodiments of the present invention.
Figure 11:
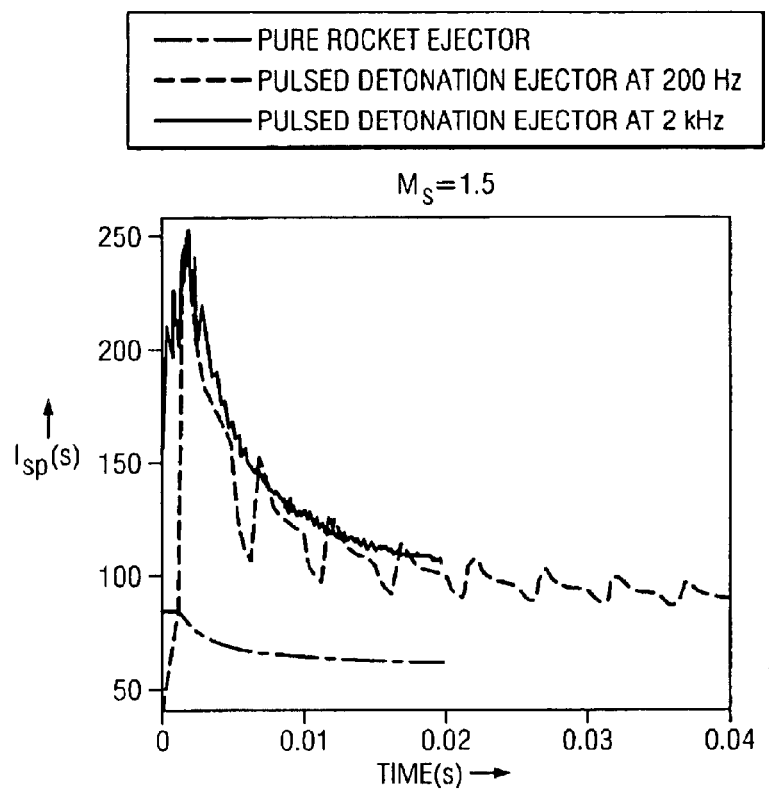
FIG. 11 is a graph showing Isp variation as a function of time for certain embodiments of the present invention.
Figure 12:
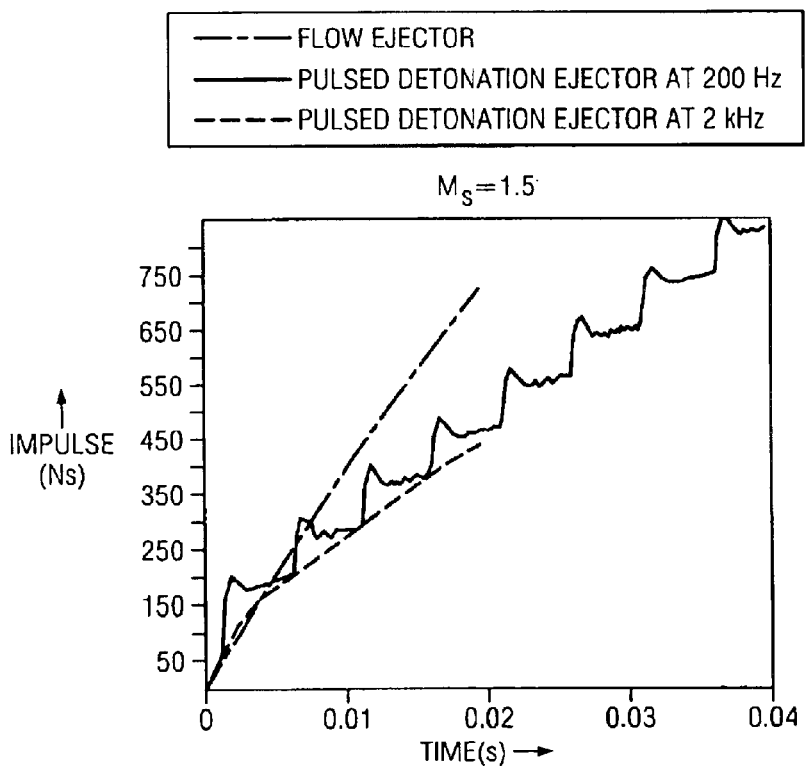
FIG. 12 is a graph showing impulse variation as a function of time for certain embodiments of the present invention.
Figure 13:
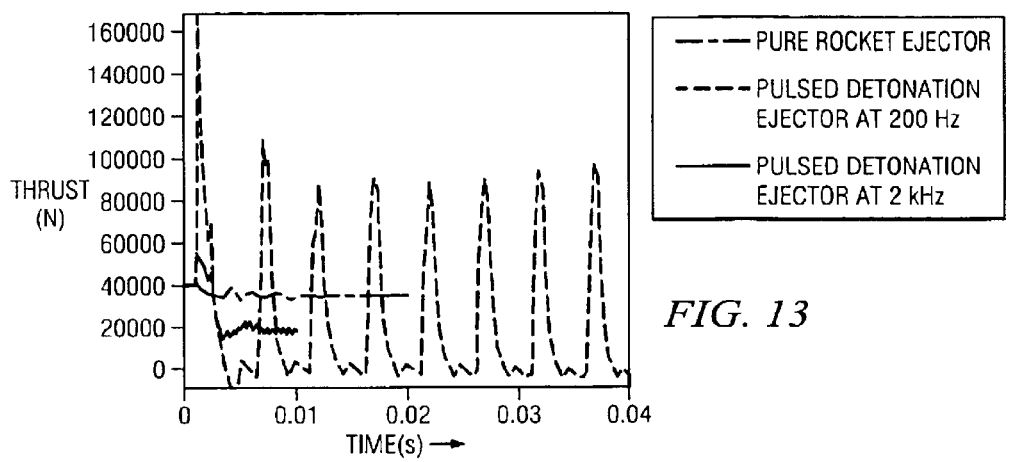
FIG. 13 is a graph showing thrust as a function of time for certain embodiments of the present invention.
Figure 14:
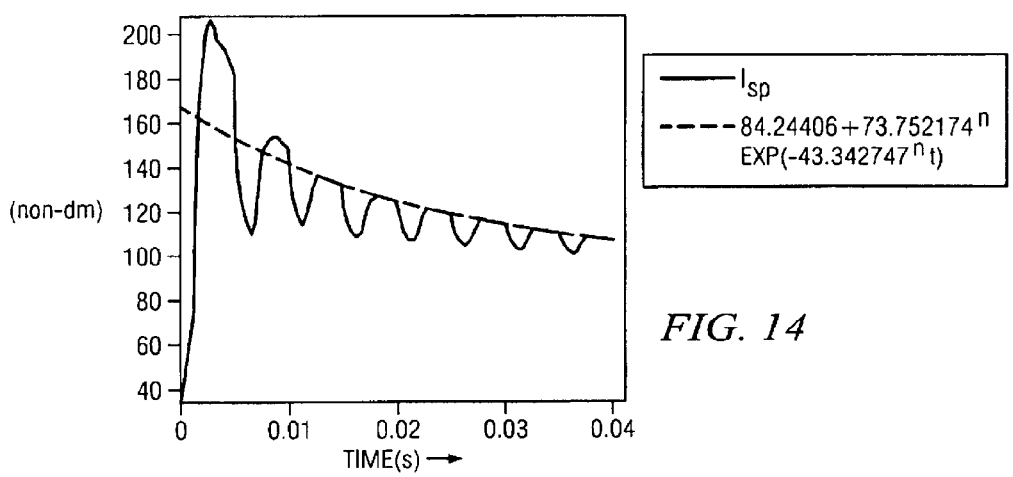
FIG. 14 is a graph showing an exponential curve fit for Isp as a function of time for certain embodiments of the present invention.
Figure 15:
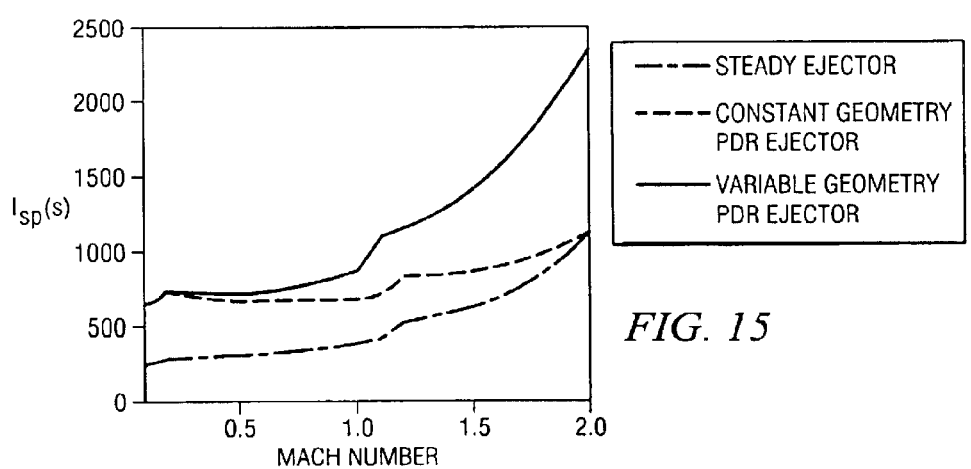
FIG. 15 is a sample SSTO trajectory specific impulse graph showing Isp as a function of Mach number for certain embodiments of the present invention.
Figure 16:
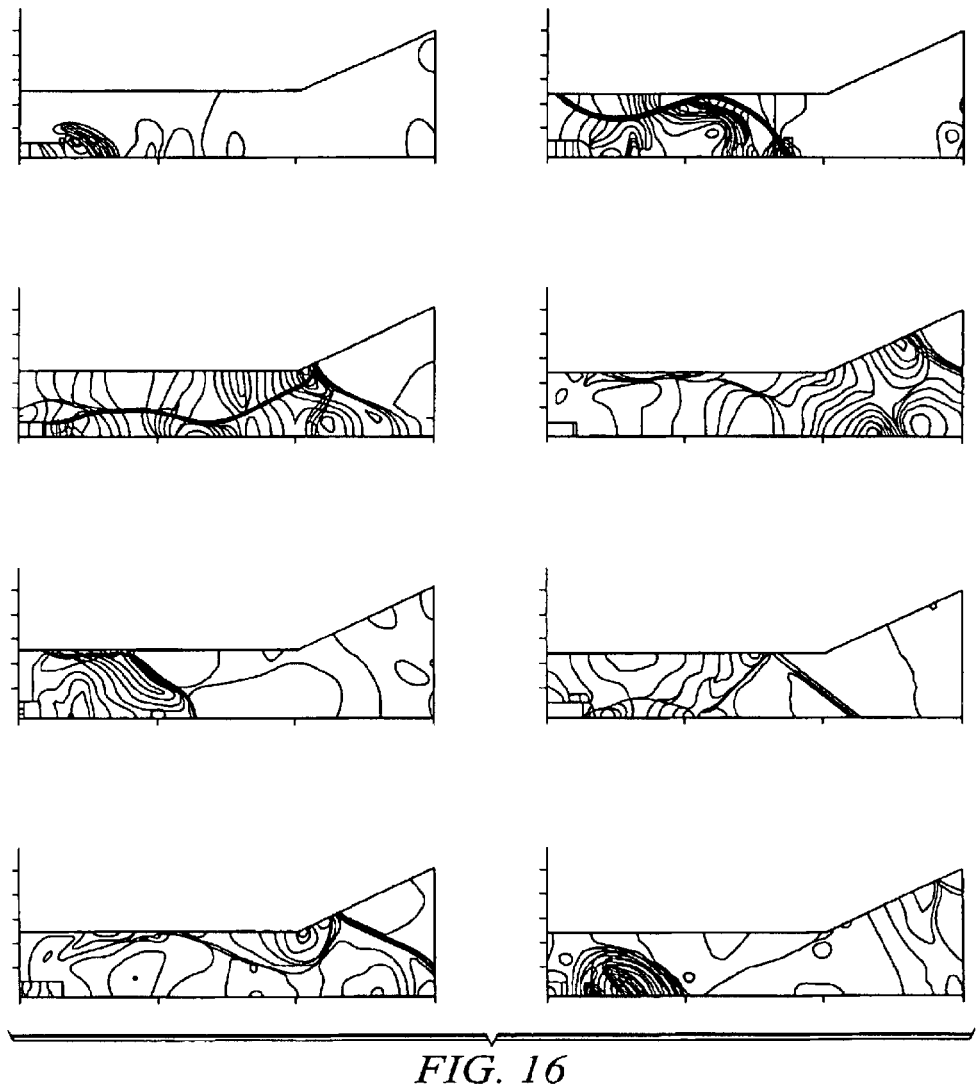
FIG. 16 is a series of graphs showing one cycle of ejector operation at secondary Mach number 0.15 for certain embodiments of the present invention.
Figure 17:
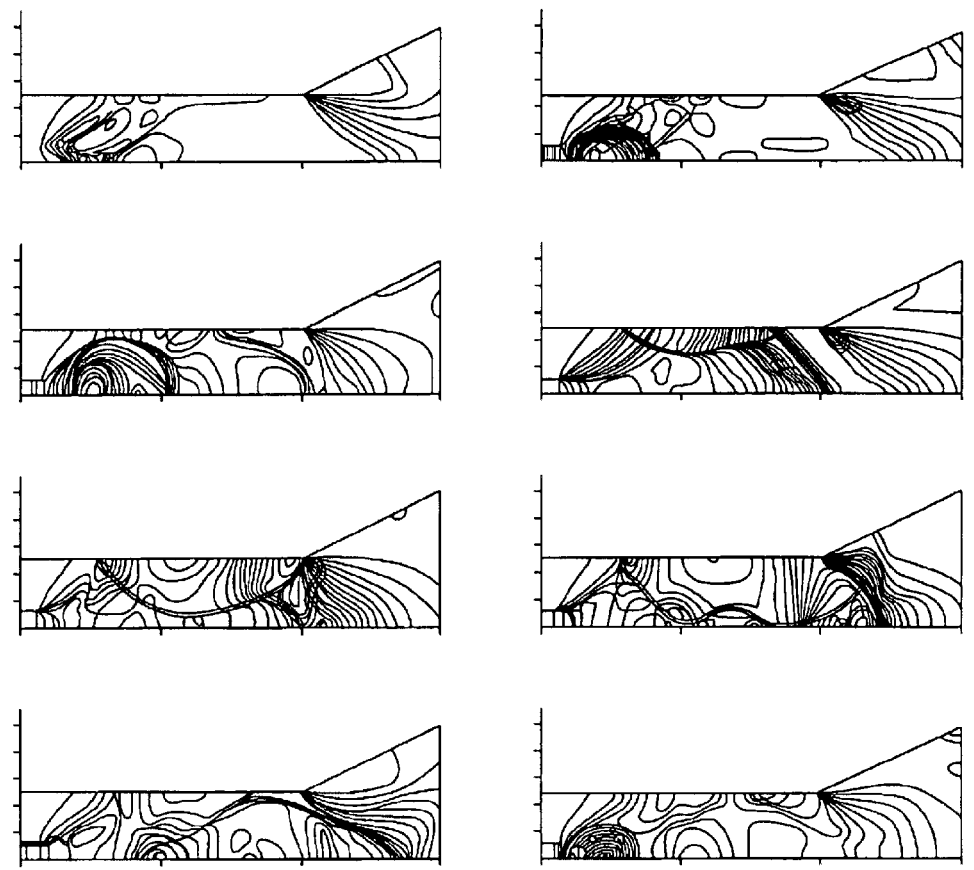
FIG. 17 is a series of graphs showing one cycle of ejector operation at secondary Mach number 1.5 for certain embodiments of the present invention.

FIGS. 5–17 graphically depict the results of theoretical numerical simulations performed on theoretical models of the pulsed detonation rocket of the present invention. FIG. 5 is a sample plot of thrust and specific impulse from a multi-cycle airbreathing pulsed detonation engine. FIG. 6 is a sample mixing region at the exhaust of a pulsed detonation rocket, of a flow that is mixing and burning. FIG. 7 shows a graph of an ideal cycle averaged incompressible flow estimate of ejector thrust augmentation. FIG. 8 shows a graph of an ideal cycle compressible flow estimate of ejector system thrust augmentation. FIG. 9 is a graph showing impulse variation as a function of time for certain embodiments of the present invention. FIG. 10 is a graph showing Isp variation as a function of time for certain embodiments of the present invention. FIG. 11 is a graph showing Isp variation as a function of time for certain embodiments of the present invention. FIG. 12 is a graph showing impulse variation as a function of time for certain embodiments of the present invention. FIG. 13 is a graph showing thrust as a function of time for certain embodiments of the present invention. FIG. 14 is a graph showing an exponential curve fit for Isp as a function of time for certain embodiments of the present invention. FIG. 15 is a sample SSTO trajectory specific impulse graph showing Isp as a function of Mach number for certain embodiments of the present invention. FIG. 16 is a series of graphs showing one cycle of ejector operation at secondary Mach number 0.15 for certain embodiments of the present invention. Finally, FIG. 17 is a series of graphs showing one cycle of ejector operation at secondary Mach number 1.5 for certain embodiments of the present invention.

A unique feature of a pulsed normal detonation wave engine mode (NDWE) is the use of pulsed, unsteady normal detonation waves propagating upstream through a supersonic flow in the combustion chamber as the primary thrust producing mechanism. One advantage to this approach is the elimination of the need to reduce the inlet flow velocity to subsonic speeds prior to entering the detonation chamber, which allows the detonation chamber temperature to be held to levels below the autoignition temperature of the fuel-air mixture. Thus, it becomes feasible to consider using airbreathing pulse detonation engine concepts for hypersonic flight.

In the NDWE mode, fuel is injected in a pulsating manner into the supersonic flow field within the detonation chamber. The resulting flow consists of regions of near-stoichiometric fuel-air mixtures propagating downstream at the detonation chamber Mach number M, separated by regions of air. The fuel-air mixture is ignited at a downstream location, producing detonation waves that propagate both upstream and downstream into the fuel-air mixture.

Figure 18:
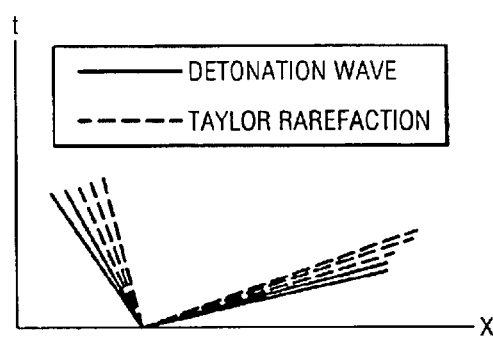
FIG. 18 is an idealized wave diagram showing the relationship between upstream and downstream detonation waves and Taylor rarefaction waves.
Figure 19:
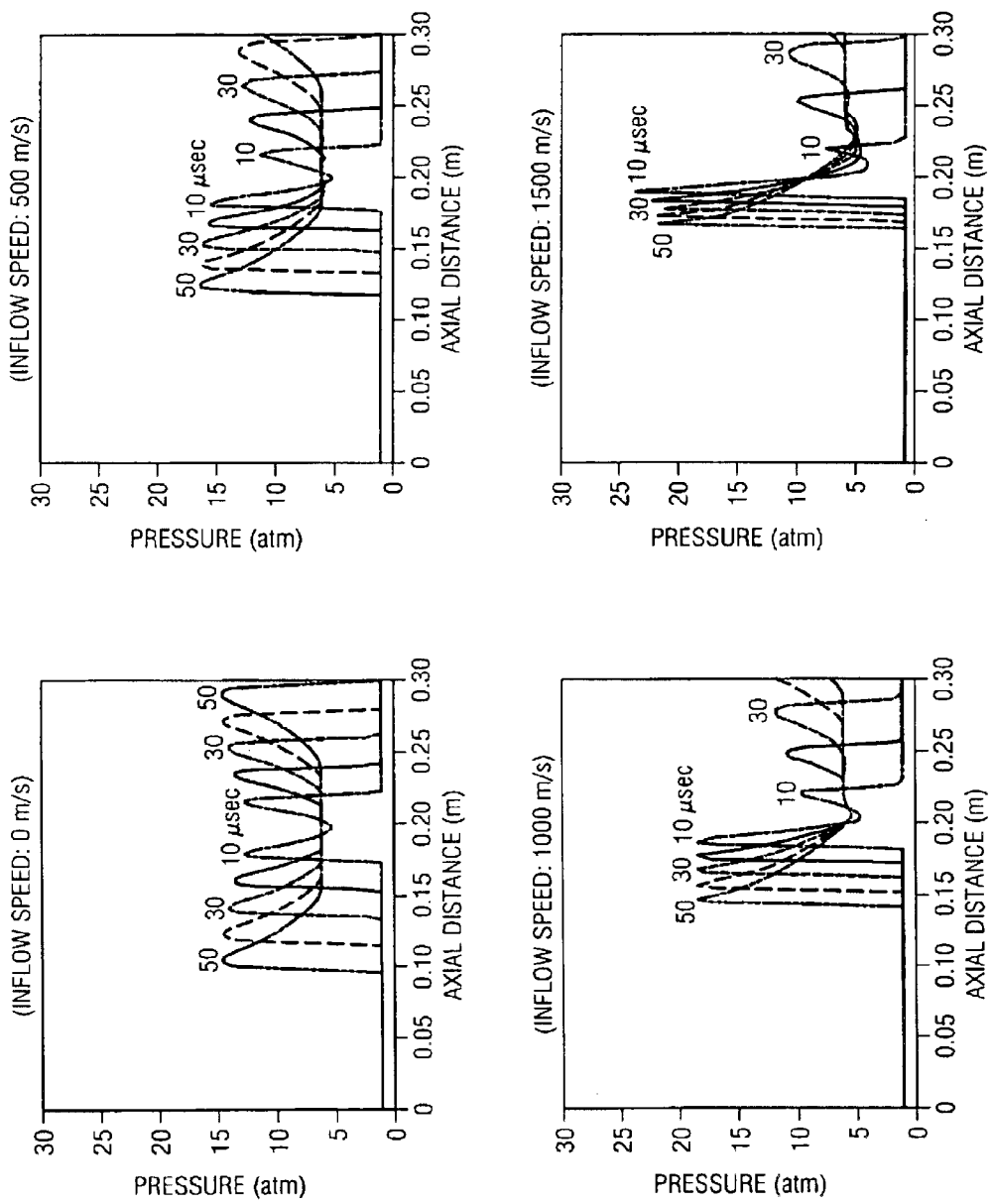
FIG. 19 is a set of graphs showing the effect of detonation chamber velocity on detonation wave propagation.

FIG. 18 is an idealized wave diagram showing the relationship between upstream and downstream detonation waves and Taylor rarefaction waves. FIG. 19 is a set of graphs showing the effect of detonation chamber velocity on detonation wave propagation. For V3=0, two opposite-facing detonation waves propagate into the fuel-air mixture, followed by Taylor rarefaction waves. As the detonation chamber velocity increases, the rate of propagation of the upstream facing wave is reduced and wave strength, as indicated by the pressure rise through the wave, increases. In contrast, the downstream facing wave is weakened and convected downstream into the nozzle at an increasing rate. As the chamber velocity approaches the Chapman-Jouguet wave speed, the upstream facing wave becomes a standing wave, and further increases in chamber velocity would cause the upstream facing wave to be convected downstream. At this point, the engine naturally transitions to Mode 3, consisting of a steady oblique detonation wave (ODW) mode of operation. Note that for a chamber static pressure of one atm, the static pressure in the region between the two Taylor rarefaction waves is increased to a level of about 5 atm. Furthermore, a significant increase in total enthalpy occurs as a result of the detonation of the fuel-air mixture. Expansion of this high-energy flow through the exit nozzle may provide thrust augmentation over that obtained from a conventional scramjet cycle, which typically operates with combustion chamber pressures on the order of 1 atm or less.

An added benefit the pulsed normal detonation wave engine concept is the self-purging nature of the operation. By proper timing of the fuel injection and ignition pulses, a slug of pure air can be inserted between fuel-air slugs, thus clearing residual combustion products from the detonation chamber before ignition of next fuel-air mixture. Thus, specific impulse penalties associated with separate injection of purge air commonly employed in conventional PDE concepts are avoided.

Figure 20:
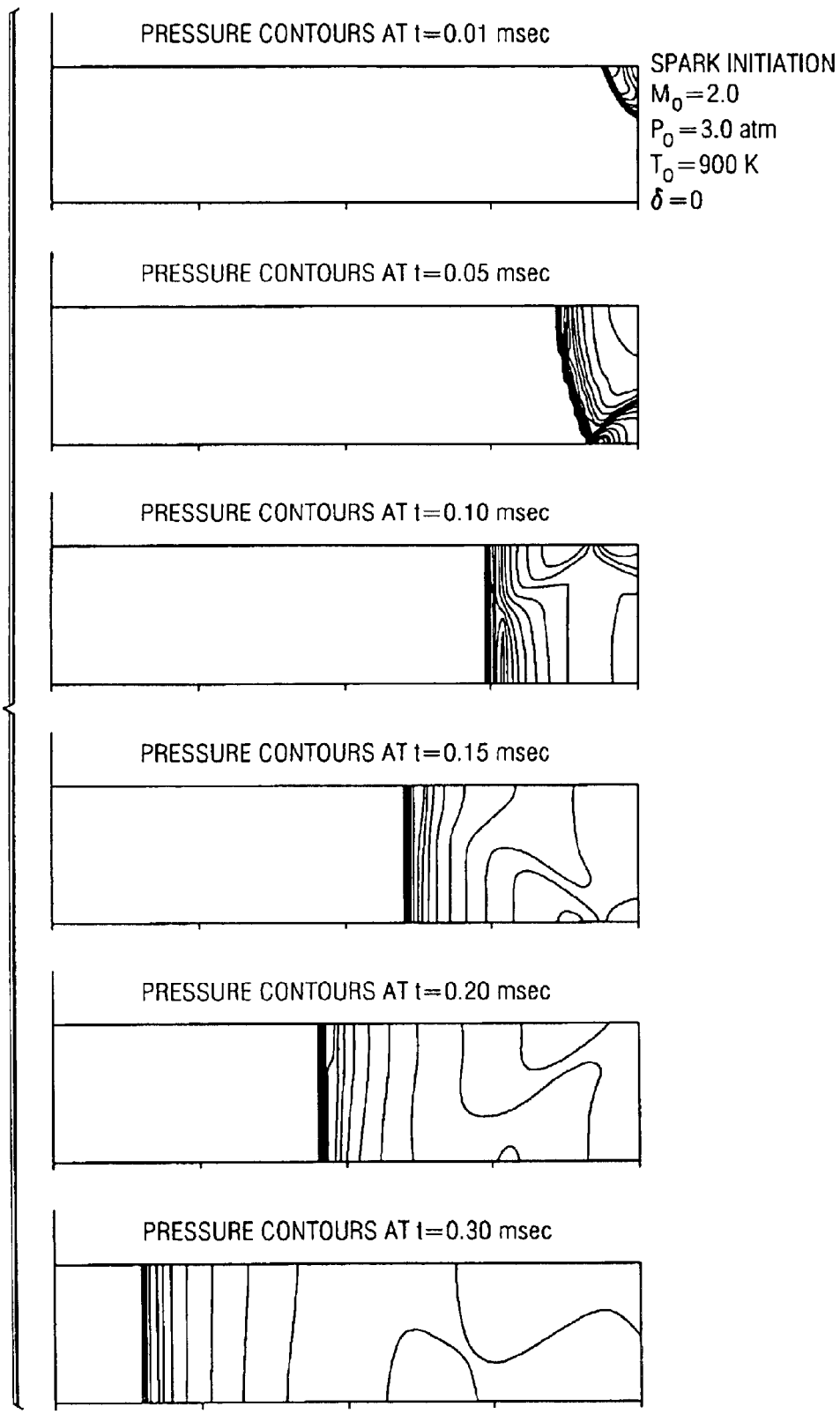
FIG. 20 is a set of graphs showing the upstream propagation of an arc-initiated detonation wave in a constant area chamber.

One issue important to the successful operation of the pulsed normal detonation wave engine is the ability to initiate a detonation wave in a supersonic flow. FIG. 20 is a set of graphs showing the upstream propagation of an arc-initiated detonation wave in a constant area chamber. The arc is initiated on one side of the chamber, and initially propagates into the chamber as a two-dimensional wave. The wave impacts the opposite side of the chamber, and quickly transitions to a near planar wave propagating upstream into the flow. No adverse affects of the supersonic flow on detonation initiation have been observed, and the results are very similar to detonation initiation simulations for quiescent mixtures.

Figure 21:
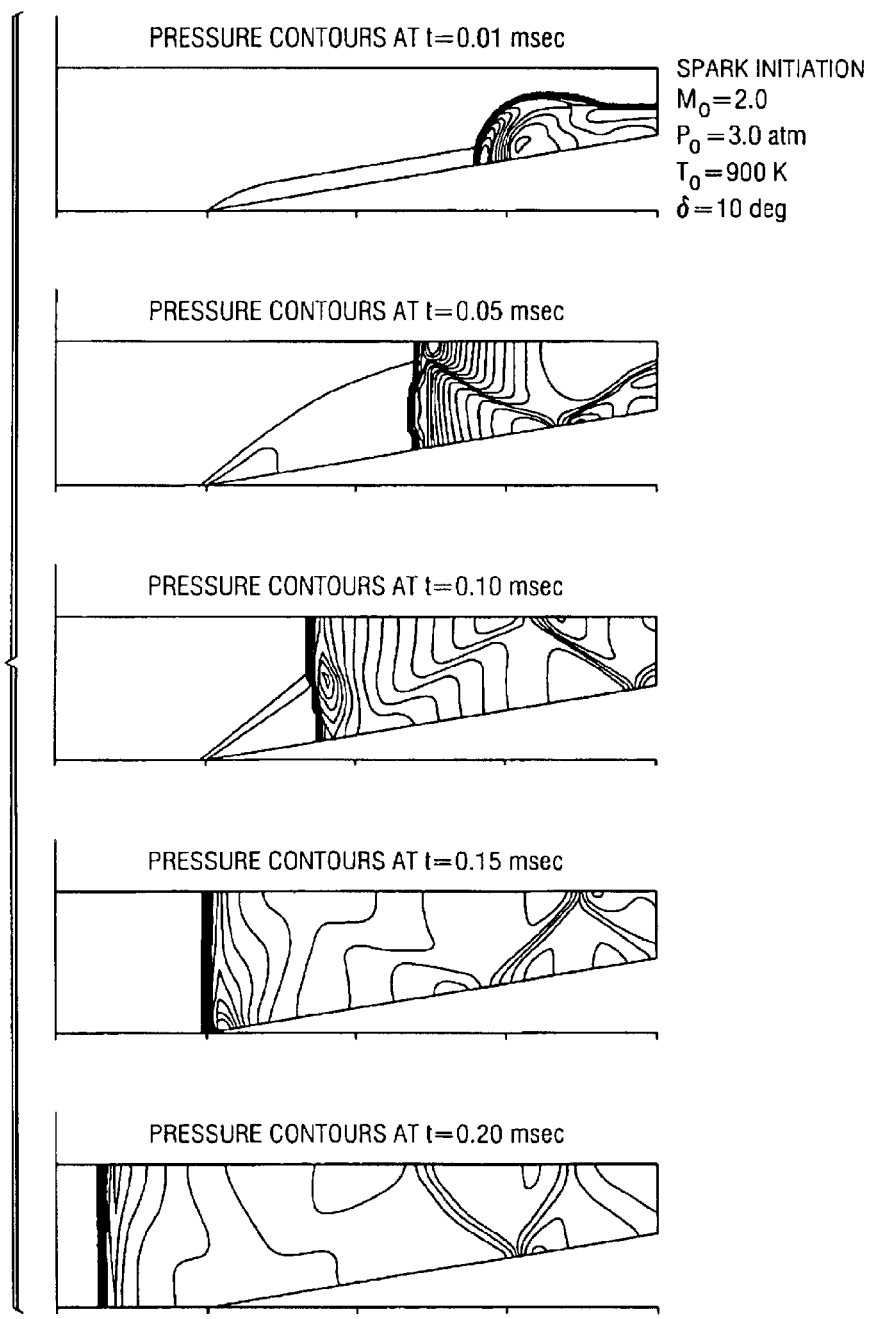
FIG. 21 is a set of graphs showing the upstream propagation of an arc-initiated detonation wave on a ten-degree ramp.

For the oblique detonation wave mode of operation (mode 3), a compression ramp may support the oblique detonation wave. FIG. 21 is a set of graphs showing the upstream propagation of an arc-initiated detonation wave on a ten-degree ramp. Arc-initiated detonation has also been investigated for location of the ignition point on the compression ramp. The initial detonation wave propagates into the flow as a cylindrical blast wave, but quickly transitions to a planar upstream-propagating detonation wave.

Figure 22:
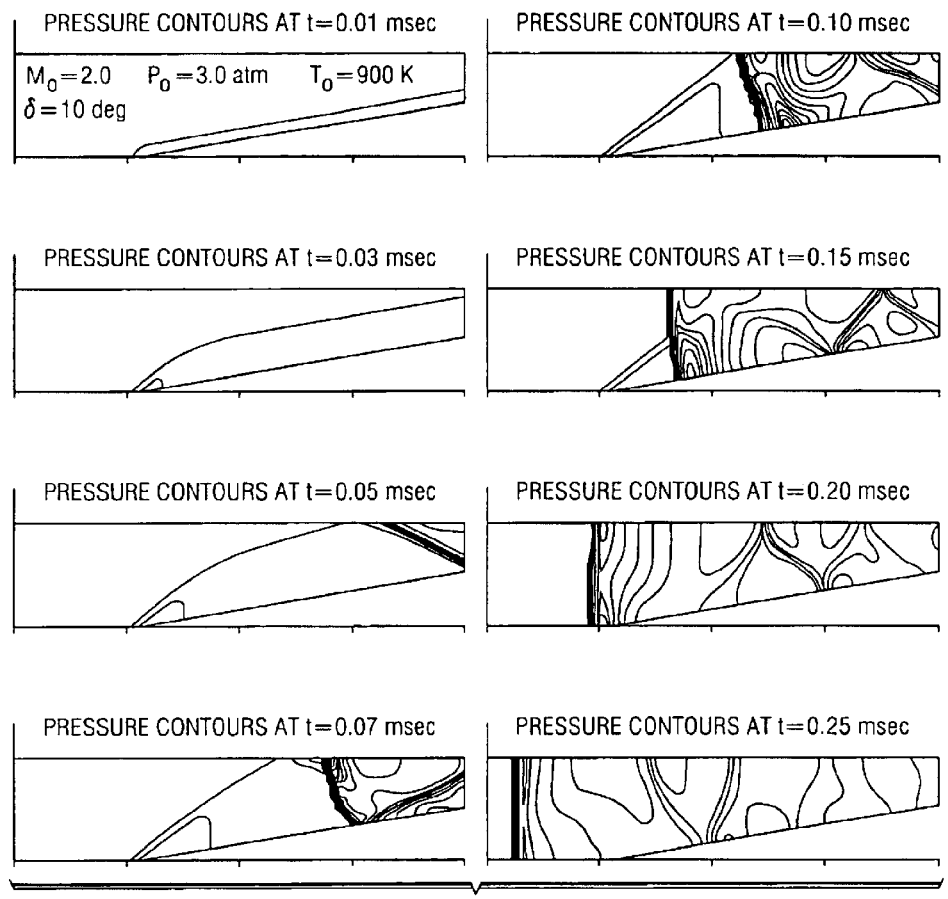
FIG. 22 is a set of graphs showing the upstream propagation of a shock-induced detonation wave.

At low chamber Mach numbers, the oblique detonation wave may detach from the compression ramp and propagate upstream into the flow. Shock-induced detonation has been found to function efficiently to initiate strong normal detonation waves. FIG. 22 is a set of graphs showing the upstream propagation of a shock-induced detonation wave. Here, an inflow impinges on a compression ramp. The incoming gas may be a stoichiometric hydrogen-air mixture. As time progresses, an oblique shock wave system is established which triggers the formation of an upstream-propagating oblique detonation wave. The oblique detonation wave quickly transitions to a normal detonation wave that detaches from the ramp and propagates upstream into the chamber. The wave formation is quite similar to that generated by an arc ignition process, and suggests that shock-induced detonation might be used instead of arc-induced detonation. Shock-induced detonation eliminates the weight penalty associated with arc ignition systems.

The pulsed normal detonation wave mode is conceived to operate with detonation chamber Mach numbers ranging from about 1.5 up to the Chapman-Jouguet (CJ) Mach number, which is of the order of 4.8 for hydrogen-air mixtures. For Mach numbers greater than the CJ Mach number, the upstream-facing wave will be convected downstream and at that point the operating mode will be switched to mode 3, consisting of a steady attached oblique detonation wave.

There is some possibility of an inlet unstart caused by impingement of the upstream-facing detonation wave on the trailing edge of the shock train in the inlet isolator. In certain embodiments of the present design, fuel is injected into a supersonic flow stream. The subsequent fuel-air mixing process results in a region of varying average equivalence ratio that propagates downstream at approximately the same velocity as the inflow. The detonation may be initiated at a downstream location, resulting in the generation of both upstream-facing and downstream-facing detonation waves.

Figure 23:
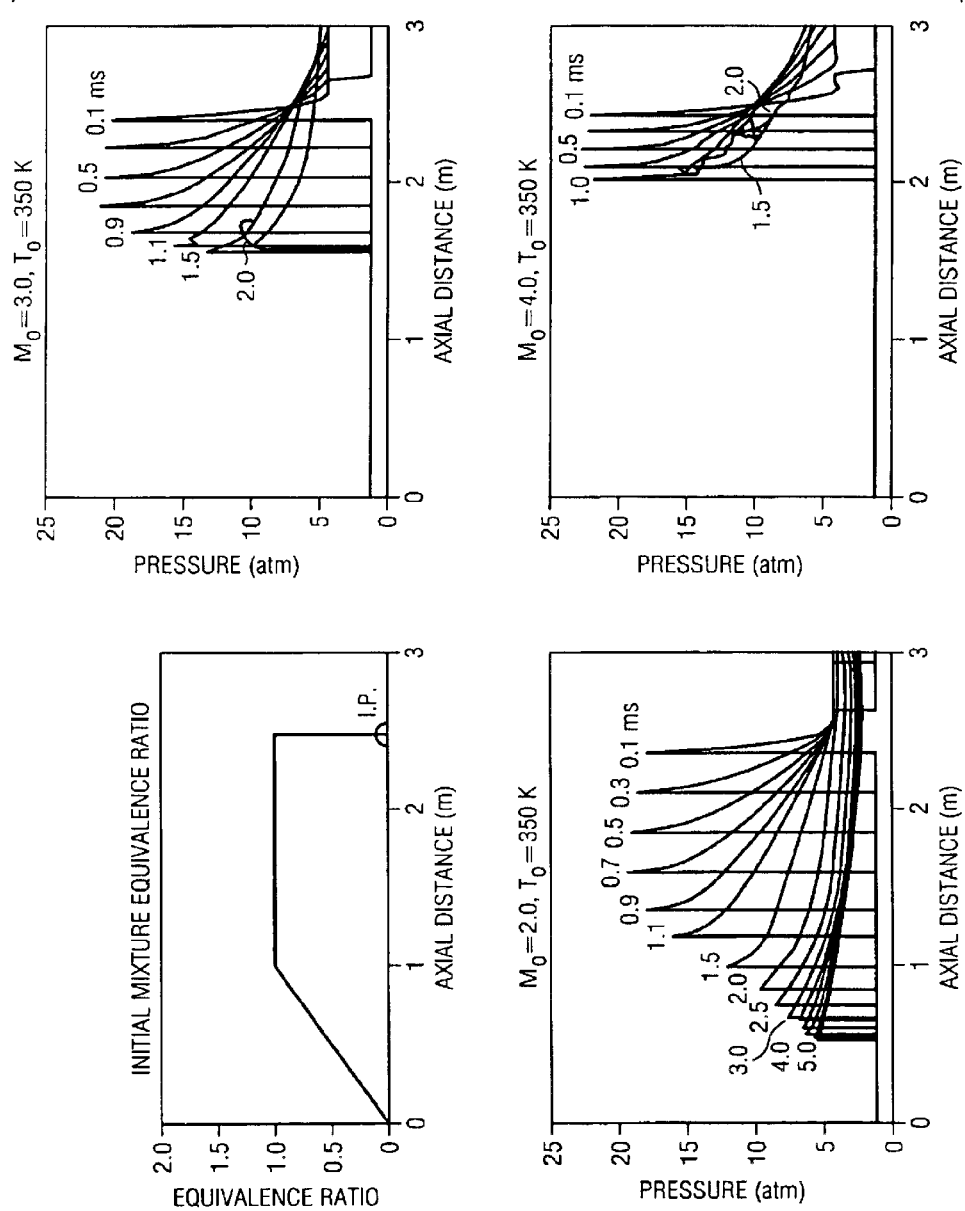
FIG. 23 is a set of graphs showing detonation wave propagation into a mixing zone for mode 2, wherein T3=350 degrees Kelvin.
Figure 24:
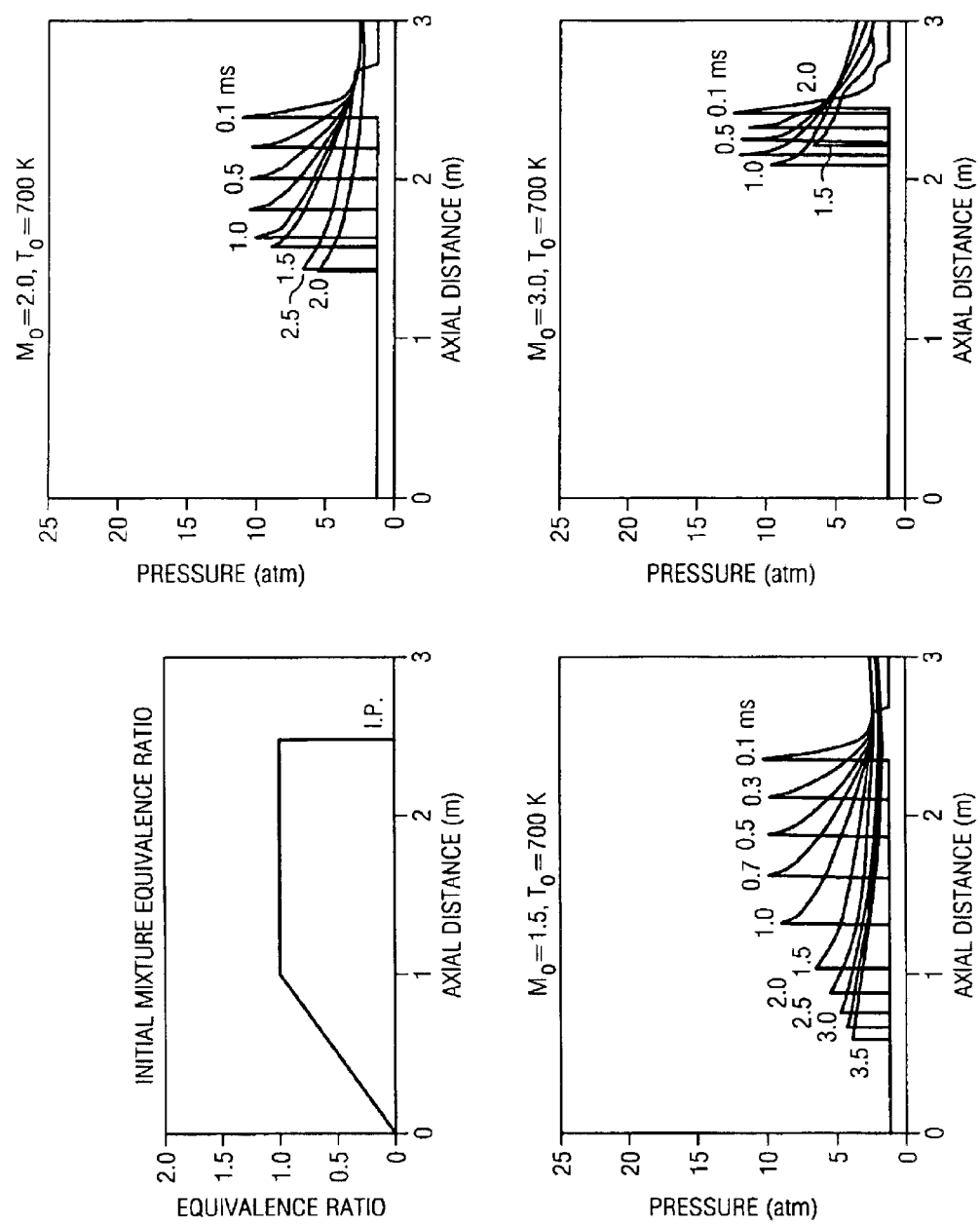
FIG. 24 is a set of graphs showing detonation wave propagation into a mixing zone for mode 2, wherein T3=700 degrees Kelvin.
Figure 25:
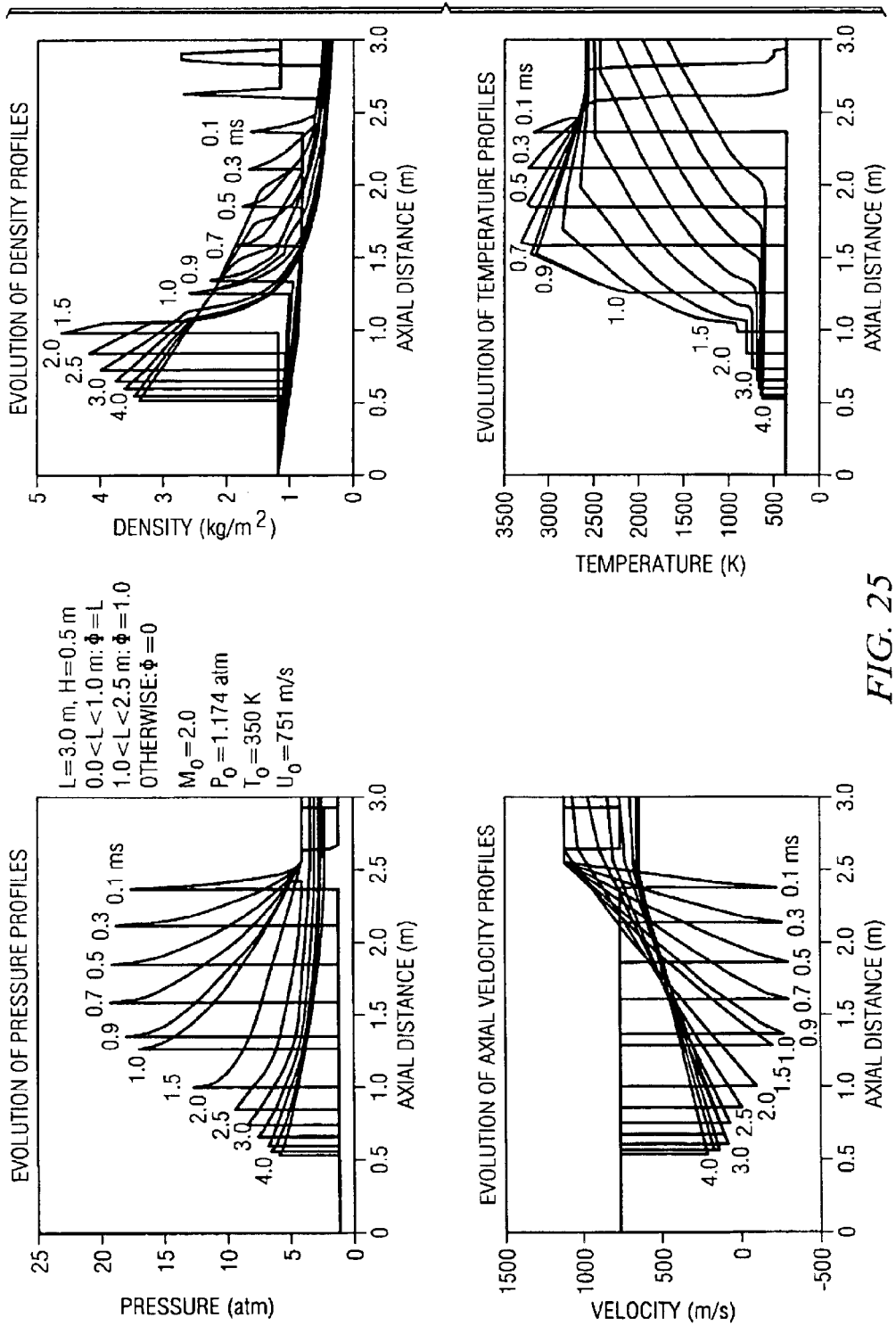
FIG. 25 is a set of graphs showing pressure, velocity, density, and temperature profiles, wherein M3=2 and T3=350 degrees Kelvin.

FIGS. 23–25 are a set of graphs showing detonation wave propagation under varying conditions. FIG. 23 is a set of graphs showing detonation wave propagation into a mixing zone for mode 2, wherein T3=350 degrees Kelvin. FIG. 24 is a set of graphs showing detonation wave propagation into a mixing zone for mode 2, wherein T3=700 degrees Kelvin. FIG. 25 is a set of graphs showing pressure, velocity, density, and temperature profiles, wherein M3=2 and T3=350 degrees Kelvin. Research has shown that an upstream propagating detonation wave causes combustion of the fuel-air mixture at the CJ speed. When the entire mixture has been burnt, the leading shock front in the detonation wave degenerates to a shock wave, which rapidly diminishes in strength as a result of the trailing Taylor rarefaction wave system. Ultimately, the upstream propagation of the wave ceases, and at higher detonation chamber Mach numbers the upstream-facing wave reverses direction and is convected downstream with the flow. The time taken for the reversal of this wave may depend upon the difference between the fastest local characteristic speed (upstream) and the fastest downstream characteristic speed. The shock wave is accelerated downstream as the flow behind the shock cools and loses enthalpy. Thus, for the range of detonation chamber Mach numbers considered, inlet unstart should not be a concern.

Figure 26:
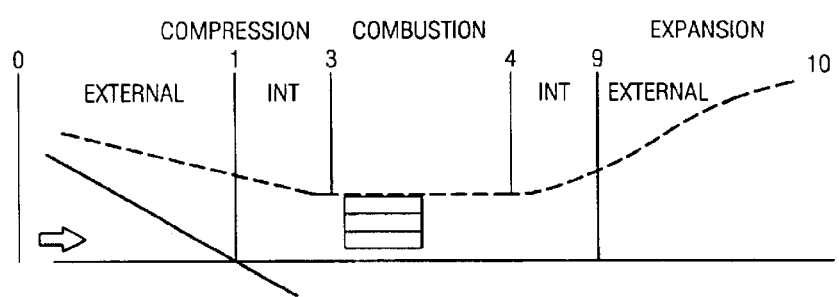
FIG. 26 is a schematic engine diagram for stream thrust analysis.

Overall engine performance may be estimated by the stream thrust analysis of Heiser and Pratt. In this method, the Stream Thrust function $$Sa = V\left(1 + \frac{RT}{V^2}\right) \quad (1)$$

is computed at each location in the engine flow path shown in FIG. 26, which is a schematic engine diagram for stream thrust analysis. The uninstalled specific thrust produced by the engine is then obtained from:

$$\frac{F}{m_0} = (1+f)Sa_{10} - Sa_0 - \frac{R_0 T_0}{V_0}\left(\frac{A_{10}}{A_0} - 1\right) \quad (2)$$

where f denotes the fuel to air ratio, and A denotes the flow cross sectional area. Specific impulse is obtained from the specific thrust above, using:

$$I_{sp} = \frac{\left(\frac{F}{m_0}\right)}{g_0 f} \quad (3)$$

where g is 9.81 m/s^2. The following procedure may be used in performing the stream thrust analysis:
1. The stream thrust values at the inlet station can be computed using representative trajectory data generated for the purpose of analysis.
2. Assuming representative pressures of 0.5 and 1 atm in the detonation chamber, the static temperature ratio in an inlet with a compression efficiency of 0.9 can be obtained. Lower efficiencies result in larger combustion temperatures, which has an effect of decreasing the range of applicability of this mode.
3. Other flow quantities at station 3 (FIG. 26) can be determined, and the effect of an upstream traveling detonation wave computed. Cycle-averaged values of pressure, temperature and velocity can be computed for the remainder of the cycle. These values are assumed to be the post-combustion values (at station 4) in the stream thrust analysis.
4. The exit plane values can be computed, assuming expansion to a static pressure equal to the ambient pressure, and an expansion efficiency of 0.9, using the equation set presented in Heiser and Pratt.

The above gives, finally, an estimate for the stream thrust at the exit plane and the exit to inlet area ratios, which are then used to compute the specific thrust and specific impulse of this propulsion system across a wide range of Mach numbers.

Figure 27:
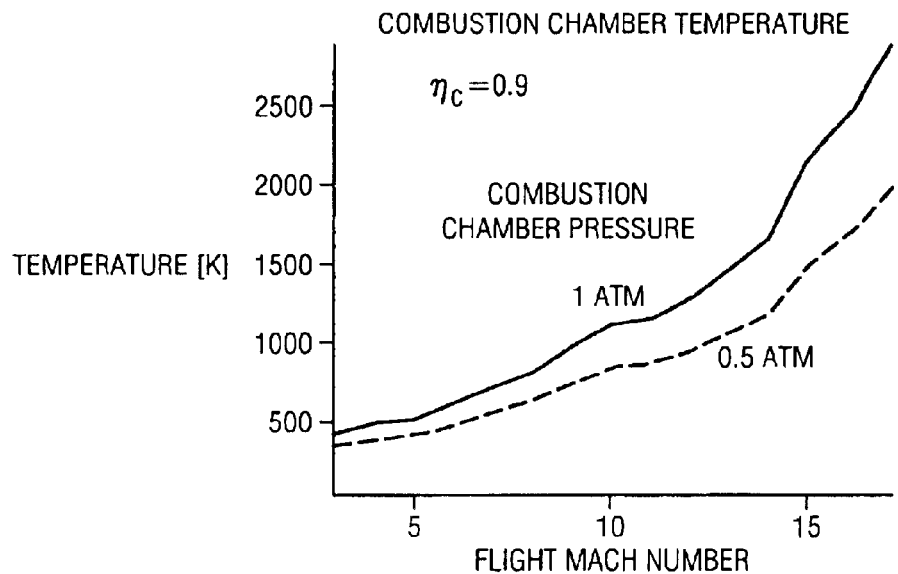
FIG. 27 is a graph showing detonation chamber temperature variation versus flight mach number.
Figure 28:
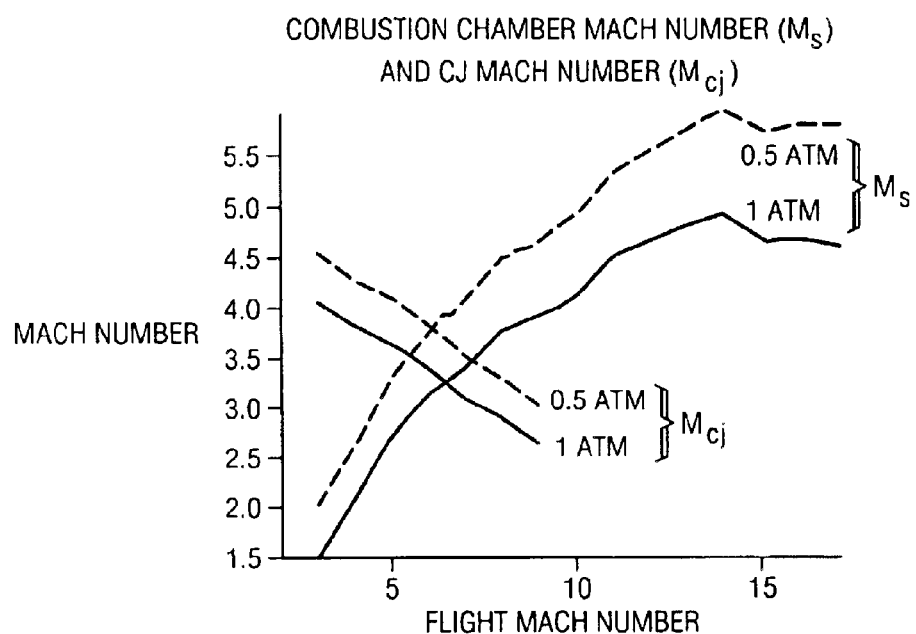
FIG. 28 is a graph showing Mach number (M3) and Chapman-Jouguet Mach number (Mcj) variation versus flight Mach number.
Figure 29:
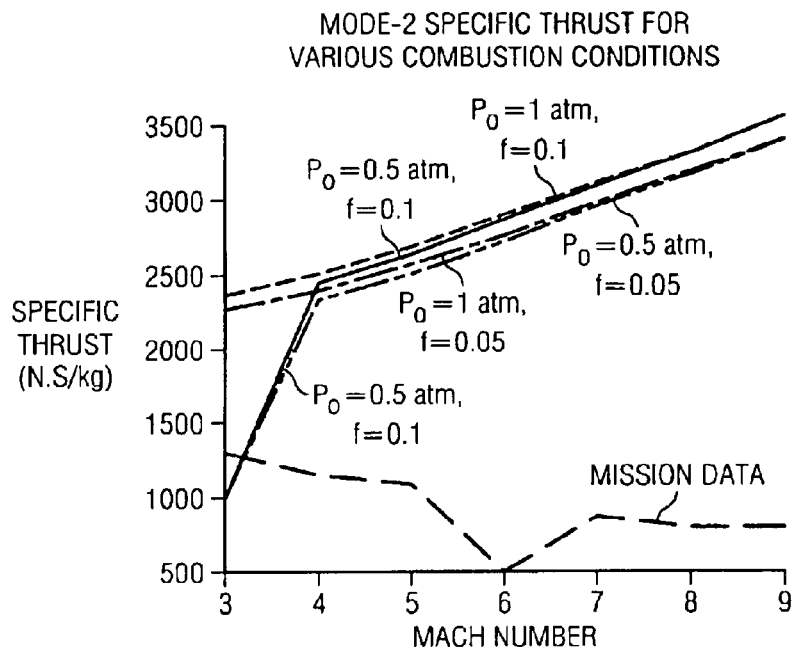
FIG. 29 is a graph showing mode 2 specific thrust versus Mach number.
Figure 30:
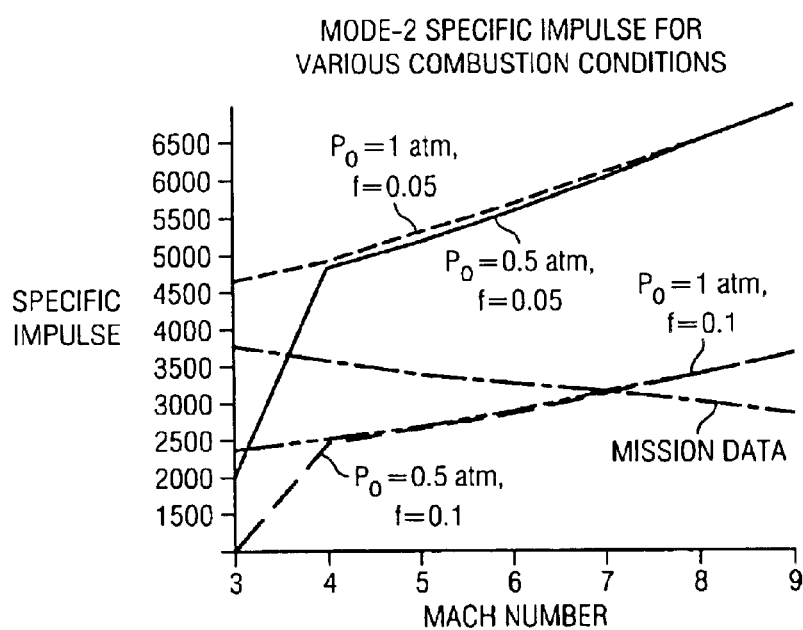
FIG. 30 is a graph showing mode 2 specific impulse versus Mach number.

Illustrative results obtained using the above analysis are presented in FIGS. 27–30. FIG. 27 is a graph showing detonation chamber temperature variation versus flight mach number. FIG. 28 is a graph showing Mach number (M3) and Chapman-Jouguet Mach number (Mcj) variation versus flight Mach number. FIG. 29 is a graph showing mode 2 specific thrust versus Mach number. FIG. 30 is a graph showing mode 2 specific impulse versus Mach number.

While the lower limit of operation is based upon the extinction distance of the detonation wave, it is possible to tailor the fuel injection process such that upstream traveling detonation waves are extinguished rapidly after they enter the region of zero fuel concentration. The upper limit occurs when the combustion chamber Mach number M3 matches the Chapman-Jouguet value for a particular trajectory. These Mach numbers become equal around 6.5 for 0.5 atm, and 7.0 for 1 atm. Above these flight Mach numbers, the engine should transition to Mode 3 (steady oblique detonation wave engine).

FIGS. 29 and 30 show computed values of specific thrust and specific impulse as a function of flight Mach number for several values of detonation chamber pressure and fuel/air ratio. The curve marked LMTAS shows the values for the representative mission trajectory.

The multi-mode engine of the present invention is a high-performance alternative to conventional scramjets or rocket-based combined cycle propulsion systems. The integration of pulsed normal detonation into the engine may be enhanced by the ability to achieve pulsed micro mixing of fuel and air at supersonic speeds. The residence time within the engine is sufficient for mixing caused by vertical mechanisms. In certain embodiments, a non-reacting shear layer may be set up prior to the injection of the fuel from PDR edges. This would entrain the fuel flow and cause mixing in the same time scales as an equivalent supersonic scramjet flow. However, the specific impulse will be much larger due to the detonative nature of the combustion. The operation of Mode 2 has been observed to be superior at higher altitudes. This also suggests the possibility of using Mode 2 for a hypersonic, cruise vehicle operating at about Mach 7 at an altitude of over 85,000 ft.

Whereas the invention has been shown and described in connection with the preferred embodiment thereof, it will be understood that many modifications, substitutions and additions may be made which are within the intended broad scope of the invention described herein. There has therefore been shown and described an improved propulsion system which accomplishes at least all of the above stated advantages.

What is claimed is:

1. A method of propelling an object, the method comprising:
generating a thrust on the object using an ejector-augmented pulsed detonation rocker first propulsion mode; and
generating a thrust on the object using a scramjet second propulsion mode.
2. The method of claim 1 wherein the first propulsion mode and second propulsion mode operate in a common flow path.
3. A method of propelling an object, the method comprising:
generating a thrust on the object using a pulsed detonation rocket first propulsion mode;
generating a thrust on the object using a second propulsion mode; and
generating a thrust on the object using a third propulsion mode.
4. The method of claim 3 wherein the first propulsion mode is ejector-augmented.
5. The method of claim 3 wherein the second propulsion mode is a scramjet mode.
6. The method of claim 3 wherein the first propulsion mode and second propulsion mode operate in a common flow path.
7. The method of claim 3 wherein the third propulsion mode is a steady oblique detonation wave mode.
8. The method of claim 3 wherein the second propulsion mode and third propulsion mode operate in a common flow path.
9. The method of claim 3 wherein the first, second, and third propulsion modes operate in a common flow path.
10. A method of propelling an object, the method comprising:
generating a thrust on the object using a pulsed detonation rocket first propulsion mode;

generating a thrust on the object using a second propulsion mode;

generating a thrust on the object using a third propulsion mode; and generating a thrust on the object using a fourth propulsion mode.

11. The method of claim 10 wherein the first propulsion mode is ejector-augmented.

12. The method of claim 10 wherein the second propulsion mode is a scramjet mode.

13. The method of claim 10 wherein the first propulsion mode and second propulsion mode operate in a common flow path.

14. The method of claim 10 wherein the third propulsion mode is a steady oblique detonation wave mode.

15. The method of claim 10 wherein the second propulsion mode and third propulsion mode operate in a common flow path.

16. The method of claim 10 wherein the first, second, and third propulsion modes operate in a common flow path.

17. The method of claim 10 wherein the fourth propulsion mode is a pulsed detonation rocket mode.

18. The method of claim 10 wherein the first, second, and fourth propulsion modes operate in a common flow path.

19. The method of claim 10 wherein the first, second, third, and fourth propulsion modes operate in a common flow path.

20. A method of propelling an object the method comprising:

generating a thrust on the object using a pulsed detonation rocket first propulsion mode;

generating a thrust on the object using a second propulsion mode; and generating a thrust on the object using a third propulsion mode;

wherein the first, second, and third propulsion modes operate in a common flow path.

21. The method of claim 20 wherein the first propulsion mode is ejector-augmented.

22. The method of claim 20 wherein the second propulsion mode is a scramjet mode.

23. The method of claim 20 wherein the first propulsion mode and second propulsion node operate on a common flow path.

24. The method of claim 20 wherein the third propulsion mode is a steady oblique detonation wave mode.

25. The method of claim 20 wherein the second propulsion mode and third propulsion mode operate in a common flow path.

26. A method of propelling an object, the method comprising:

generating a thrust on the object using a first propulsion mode;

generating a thrust on the object using a second propulsion mode;

generating a thrust on the object using a third propulsion mode; and generating a thrust on the object using a fourth propulsion mode;

wherein the first propulsion mode and second propulsion mode operate in a common flow path.

27. The method of claim 26 wherein the second propulsion mode and third propulsion mode operate in a common flow path.

28. The method of claim 26 wherein the first, second, and third propulsion modes operate in a common flow path.

29. The method of claim 26 wherein the first propulsion mode is a pulsed-detonation rocket mode.

30. The method of claim 26 wherein the first propulsion mode is ejector-augmented.

31. The method of claim 26 wherein the second propulsion mode is a scramjet mode.

32. The method of claim 26 wherein the third propulsion mode is a steady oblique detonation wave mode.

33. The method of claim 26 wherein the fourth propulsion mode is a pulsed detonation rocket mode.

34. The method of claim 26 wherein the first, second, and fourth propulsion modes operate in a common flow path.

35. The method of claim 26 wherein the first, second, third, and fourth propulsion modes operate on a common flow path.

* * * * *